June 26, 1928.
B. C. BECKMAN
COMPOSITE SIDING
Filed Nov. 30, 1923
1,674,630
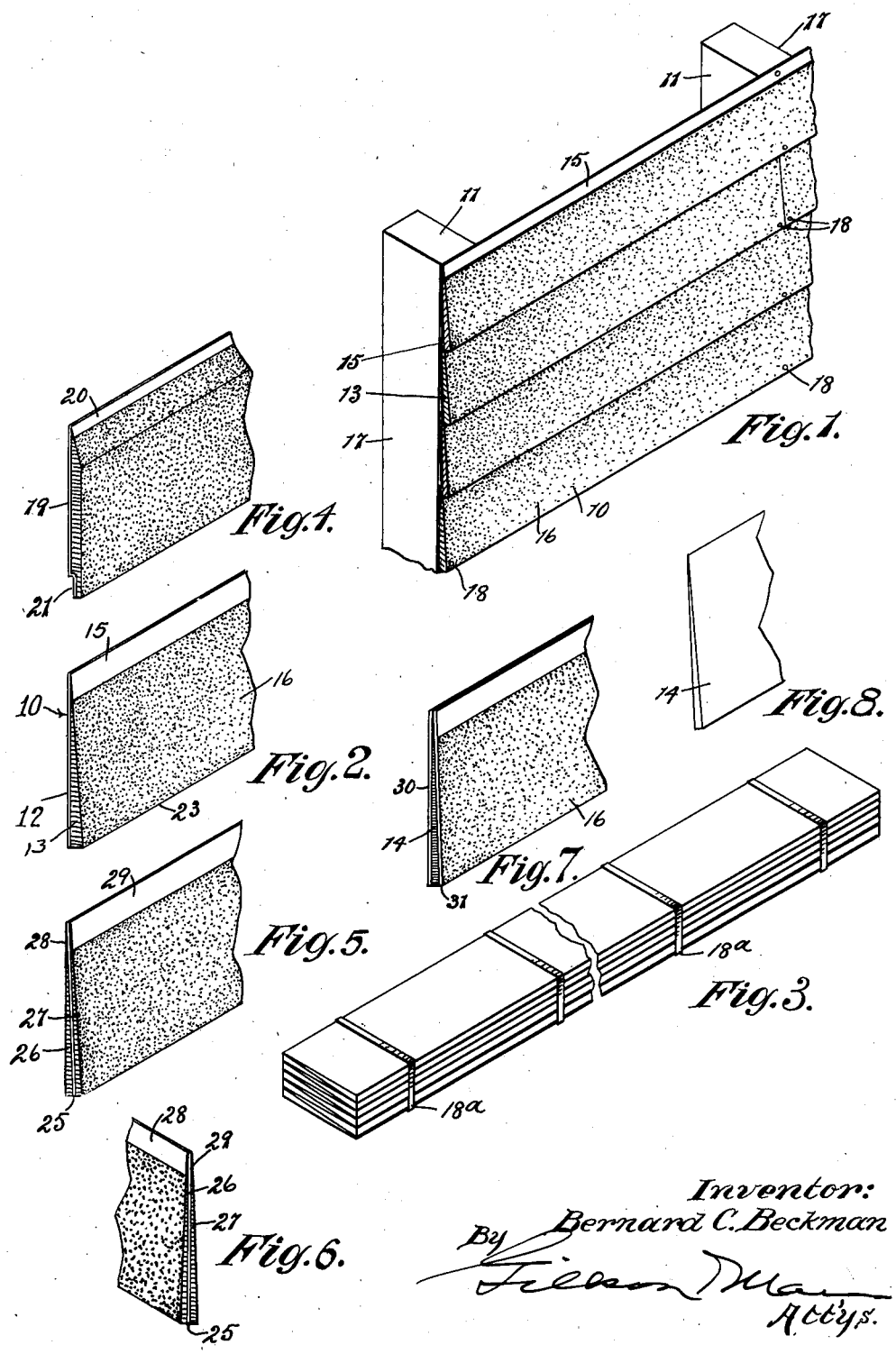
Inventor:
Bernard C. Beckman
By
Attys.

Patented June 26, 1928.

1,674,630

UNITED STATES PATENT OFFICE.

BERNARD C. BECKMAN, OF NAPERVILLE, ILLINOIS, ASSIGNOR TO BECKMAN-DAWSON ROOFING COMPANY, A CORPORATION OF ILLINOIS.

COMPOSITE SIDING.

Application filed November 30, 1923. Serial No. 677,621.

This invention relates to substitutes for lumber and more particularly to composite siding for the walls of buildings such as dwellings, garages and the like.

One of the objects of the invention is the provision of a composite siding for frame structures having the dimensions of the conventional wooden siding and simulating it in both contour and appearance.

Another object of the invention is the provision of a composite siding for frame buildings that is ornamental in appearance, weather-proof in composition, that will not run, warp, shrink or split and will not require the application of paint or other protective covering from time to time to preserve the appearance and structure of the same from the deleterious action of the weather.

Another object of the invention is the provision of boards of composite siding that are moisture-proof, and of such a nature that when properly applied to the walls of buildings they will efficiently exclude the moisture and effectively protect the building from inclement weather.

A still further object of the invention is the provision of composite siding that is of the length and width of the conventional siding and that may be bundled, shipped, handled and applied to frame structures to form the walls in the same manner as wooden siding.

Other and further objects and advantages of the invention will appear from the following description taken in connection with the accompanying drawings, in which Fig. 1 is a perspective view of a portion of the wall of a building showing the improved siding in position;

Fig. 2 is a perspective view of a portion of one of the composite boards;

Fig. 3 is a perspective view of a bundle of composite boards;

Fig. 4 is a perspective view of one end of a modified form of composite board;

Figs. 5 and 6 are similar views showing both sides of a different form of the composite board;

Fig. 7 is a similar view of a still further modified form of composite board; and Fig. 8 is a perspective view of one end of a felt strip employed in the manufacture of composite boards.

The individual boards or strips 10 of the composite siding, when completed, are rigid and are preferably of the dimensions of the conventional wooden siding strips or boards which are usually about four to six inches wide and from ten to twelve feet long. They are applied to the frame structure 11 of buildings to form the side walls thereof, in the same manner as wooden siding, as clearly shown in Fig. 1 of the drawing.

The foundation, base or body 12 of the board or siding 10 may be of any suitable material. Preferably it is of felt, although it is understood that other fibrous material may be employed. If it is desired to render the boards less inflammable asbestos may be used as the base. If asbestos be employed, however, it will be desirable to incorporate therein texture-opening bodies such as animal or vegetable fiber or mineral dust, as otherwise the asbestos will not absorb enough bituminous material to make the boards sufficiently rigid.

The base 12 is impregnated with a waterproofing substance that is liquid at high temperatures but which is hard, and will render the base stiff, at ordinary temperatures. A bituminous compound such as hydroline asphalt which melts at about 200° Fahrenheit, and is stiff and hard at ordinary temperatures, is admirably adapted for this purpose. The asphalt is heated to about 440° F. and the felt is subjected to a treatment of the same. The felt may be impregnated with any other suitable compound that will render the same stiff, hard and waterproof at ordinary temperatures. The base may, of course, have the bituminous material incorporated therein during its manufacture, as by disintegrating the material of the base and mixing it with liquid bituminous material and forming the mass into the required shape by running the same through suitable rolls.

The base is covered on at least one face thereof with a layer 13 of waterproofing substance that is very hard and stiff and that will not run or break easily at ordinary temperatures as for instance a hydrocarbon compound such as asphaltum, pitch or the like.

Excellent results have been obtained by employing what is known as Wasco asphalt which melts at about 260° F. and is very hard and stiff at ordinary temperatures. The material is applied while hot, whereby it will adhere to the base and form a unitary structure therewith.

In order to simulate wooden siding the boards are transversely tapered. This may be accomplished by tapering the waterproofing layer or layers 13 as shown in Figs. 2 and 5 or by employing a tapered base 14 as shown in Figs. 7 and 8. The use of a tapered base enables the layer of waterproofing material to be applied to the base with uniform thickness without destroying the taper of the finished board and, furthermore, the use of a tapered dry felt as shown in Fig. 8, from which the base is made, permits the felt manufacturer to furnish the felt for the base and avoids the necessity of incorporating a binder during the manufacture of the tapered base, as is the common practice at the present time.

A suitable layer of grit, 16, as mineral dust, sand, pebbles, or crushed slate of the color desired for the walls of the building, is embedded in the layer 13, while the same is soft or pliable. Grit is not applied to the upper portion 15 of the siding whereby the overlapping edges of the boards which are saturated with bituminous material will lie close together and will more or less adhere to prevent the entrance of wind and moisture at the joints, thereby minimizing the necessity for building paper and sheathing that is so essential in the walls of wooden buildings.

The siding or boards 10 are adapted to be applied to the frame structure 11 in overlapping relation and are secured in position by nails 18 which may extend through the overlapping edges thereof and into the studding 17. This method of nailing the material to the studding is practical since there is no shrinkage of the material, whereas with wooden siding the shrinking of the boards causes the splitting of the same, thereby permitting the entrance of wind and moisture.

When the boards are completed and cut to length they may be secured in bundles for shipment by arranging them in rectangular packages by alternating the thick and thin edges of the boards and applying bands or ties 18ᵃ around the same, as shown in Fig. 3.

In the modified form of the board shown in Fig. 4, the felt 19 is of uniform thickness and the asphalt layer is beveled at its upper edge. The underlapping portion 20 of the asphalt is not coated with grit whereby when the boards are in place they will lie close together. The lower end of the base contains an offset 21 which forms a rabbet for receiving the upper edge of the adjacent siding.

In Figs. 5 and 6 the base 25 is of uniform thickness and a layer of bituminous material 26 is applied to one side of the base and a layer 27 to the other. These layers are tapered toward their upper edges as at 28 and 29. They are preferably, though not necessarily, of different colors. The two sides of the board are duplicates, except as to color, thereby affording a choice of two colors for the exterior of the wall made therefrom.

In the form of the board shown in Fig. 7 the base 14 is tapered and the bituminous layers 30 and 31 are of uniform thickness but may be of different colors as in the form shown in Figs. 5 and 6. The dry felt as shown in Fig. 8 is adapted to be treated in substantially the same manner to form the base of the board as in the formation of the base 13, as described above.

A wall may be produced from boards of composite material cheaper than from wooden boards, and much cheaper than stucco. A wall of this material will not warp, split, or break by the action of the weather, and requires no painting.

This invention is not limited in its application to the particular construction herein illustrated, as various changes might be made in the construction shown without departing from the spirit of this invention, or the scope of the appended claim.

I claim:

A composite board adapted to be employed to form siding for the walls of buildings, comprising a long, narrow strip of fibrous material, impregnated with a bituminous compound, a layer of water-proofing material secured to one face of said strip, said board being tapered in cross-section, and a layer of grit embedded in the outer face of said water-proofing material, leaving a narrow portion of said layer of water-proofing material along the thin edge of said board free from grit.

BERNARD C. BECKMAN.